United States Patent [19]

Cook

[11] 4,402,632

[45] Sep. 6, 1983

[54] SEABED SUPPORTED SUBMARINE PRESSURE TRANSFER STORAGE FACILITY FOR LIQUIFIED GASES

[75] Inventor: Sidney F. Cook, Corvallis, Oreg.

[73] Assignee: Cook, Stolowitz & Frame, Visalia, Calif.

[21] Appl. No.: 180,607

[22] Filed: Aug. 25, 1980

[51] Int. Cl.[3] .......................... B65G 5/00; F16C 1/12

[52] U.S. Cl. ....................................... 405/210; 62/45; 114/257

[58] Field of Search ....................... 405/205, 210, 224; 62/45; 114/256, 257; 220/18

[56] References Cited

U.S. PATENT DOCUMENTS

| | | | |
|---|---|---|---|
| 3,695,047 | 10/1972 | Pogonowski et al. | 405/210 |
| 3,727,418 | 4/1973 | Glazier | 62/45 |
| 3,798,919 | 3/1974 | Hershner | 62/45 |
| 3,835,653 | 9/1974 | Hix | 405/210 |
| 3,880,193 | 4/1975 | Lewis | 62/45 X |
| 4,209,271 | 6/1980 | McCabe et al. | 405/210 |
| 4,232,983 | 11/1980 | Cook et al. | 405/210 |
| 4,266,887 | 5/1981 | Corder | 405/224 X |

*Primary Examiner*—David H. Corbin

*Attorney, Agent, or Firm*—David B. Harrison

[57] ABSTRACT

Cryogenically cooled and liquified energy gases are stored at substantial depth offshore in an insulated container normally resting on the seabed. Piston action of the container promotes liquid state of the liquified gases by transfer thereto of controlled pressure derived totally or in part from the ambient deep seawater.

7 Claims, 10 Drawing Figures

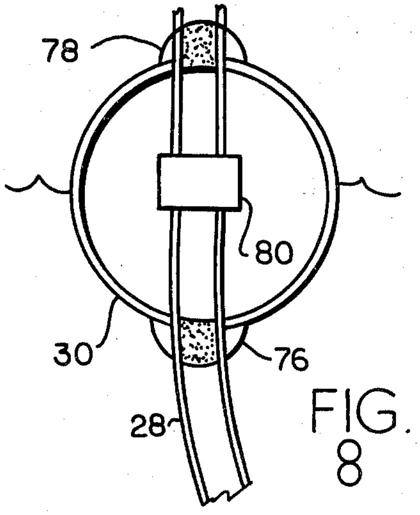
FIG. 8
FIG. 7
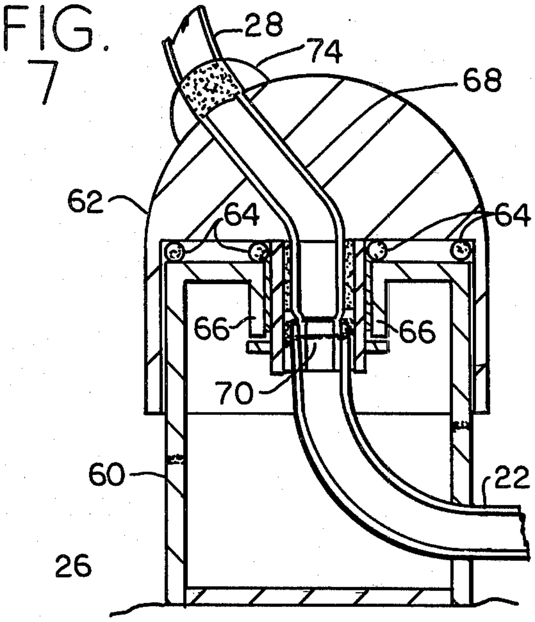
FIG. 4
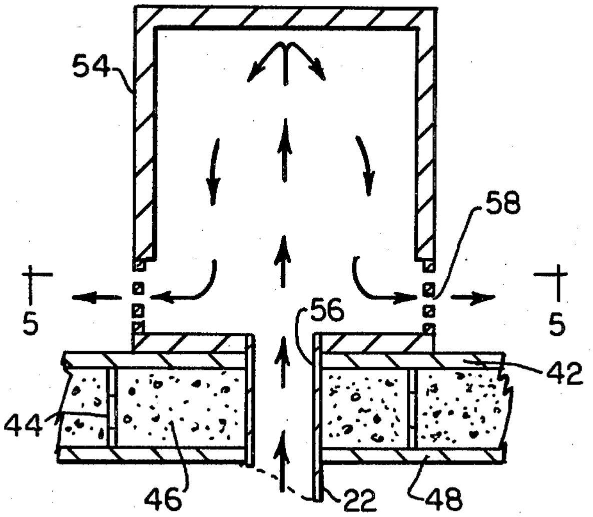
FIG. 6
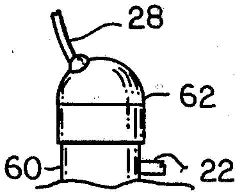
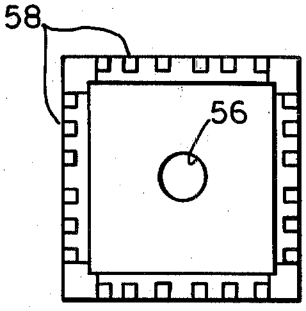
FIG. 5
FIG. 3
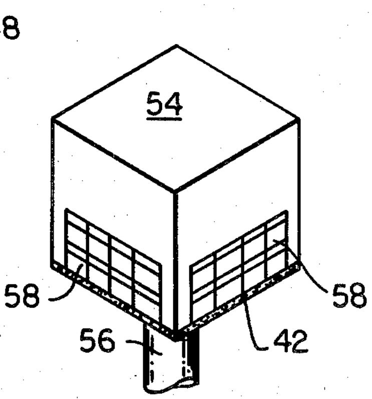

SEABED SUPPORTED SUBMARINE PRESSURE TRANSFER STORAGE FACILITY FOR LIQUIFIED GASES

BACKGROUND OF THE INVENTION

The present invention relates to a submarine storage facility for liquified energy gases, and more particularly to a pressure transfer storage facility resting on the seabed at considerable depth wherein ambient seawater pressure at that depth is available for transfer to the material stored in the facility to promote and maintain liquified state thereof.

While liquified energy gases have been known for many years, until recently the extreme hazards presented in the handling and storage of such materials have impeded usage thereof and the concomitant development of suitable storage facilities and handling techniques. While the hazards from these liquified energy gases are no less today than in earlier times, the present widespread demand for energy, along with shrinking developed worldwide crude oil reserves, has created a need for storage facilities for more plenteous energy gases stored in cryogenically cooled and liquified state. At the same time public clamor for a safe and non-hazardous, non-polluted environment has militated against any widespread onshore storage facilities development, particularly in the more densely populated areas.

The ocean environment is a particularly attractive one for liquified energy gas facilities. Its isolation from population centers reduces the potential for loss of life and property. Its capacity to dissipate methane, leaking naturally from substantial depths, further reduces surface fire hazards. Its capacity to distribute shockwaves from bombs and seismic activity evenly to marine structures by hydraulic action reduces risks of structural failures otherwise obtaining in e.g. land based facilities. Finally, the ambient pressure available at substantial depths, such as at 200 meters, along with the absence of interfering marine life forms at that depth have suggested an almost ideal environment for submerged liquified energy gas storage facilites embodying the invention herein which rest upon, but are not necessarily anchored to, the seabed.

While seabased storage facilities have been proposed in the prior art, floating surface facilities have the inherent drawback that pitching and rolling with wave action generates tremendous thermal gradients within the storage vessels and promotes unwanted regassification of the stored material. Stable storage facilities resting on the seabed in accordance with the present invention minimize these drawbacks. Use of effectively insulated rigid structure for transfer of ambient deep seawater pressure, rather than thin flexible large area membranes with organic balancing fluids to dissipate the extreme thermal gradient as has been proposed in the prior art, also reduces the thermal gradient strain and regassification tendency.

One object of the present invention is to provide a new and improved deepwater submarine storage facility for liquified gases, such as LNG.

Another object of the present invention is to apply deepwater ambient pressure to stored liquified gases to promote and maintain liquified state thereof.

A further object of the present invention is to provide a deepwater submarine storage facility for liquified gases which rests in a stable operating state upon the seabed.

Yet another object of the present invention is to provide a storage facility which will achieve the foregoing objects, efficiently, effectively, reliably and economically.

These objects are achieved by a submarine storage facility for cryogenically cooled and liquified energy gases and the like which operates offshore at a substantial depth, such as eg. 200 meters. The structure thereof includes an insulated container with a conduit leading therefrom, for introduction and removal of liquified material. A piston action provided by structure of the container transfers a controlled pressure derived from ambient water at the depth of the seabed to the stored liquified material in order to promote and maintain its liquid state throughout storage and handling. Pressure varying means to apply a selected fraction of available pressure, and ballasting means to float the structure to the surface for loading, transport, maintenance, inspection and the like are other related aspects of the present invention.

These and other objects, advantages and features will be apparent to those skilled in the art from consideration of the following detailed description of preferred embodiments presented in conjunction with the accompanying drawing.

BRIEF DESCRIPTION OF THE DRAWINGS

In the drawings:

FIG. 3 is an enlarged detail view in perspective of the internal anti-vortex fill housing of the facility depicted in the FIG. 1 facility.

FIG. 4 is a still further enlarged detail view in wide elevation and vertical section of the anti-vortex fill housing depicted in FIG. 3.

FIG. 5 is a plan view in horizontal section of the housing depicted in FIGS. 5 and 6 taken along the line 5—5 in FIG. 4.

FIG. 6 is an enlarged view in side elevation of the rotating fluid transfer coupling of the facility depicted in FIG. 1.

FIG. 7 is a still further enlarged view in side elevation and vertical diametrical section of the transfer coupling depicted in FIG. 3.

FIG. 8 is an enlarged diametrical section view of the liquified gas transfer buoy of the facility depicted in FIG. 1.

DETAILED DESCRIPTION OF PREFERRED EMBODIMENTS

Figure 1:
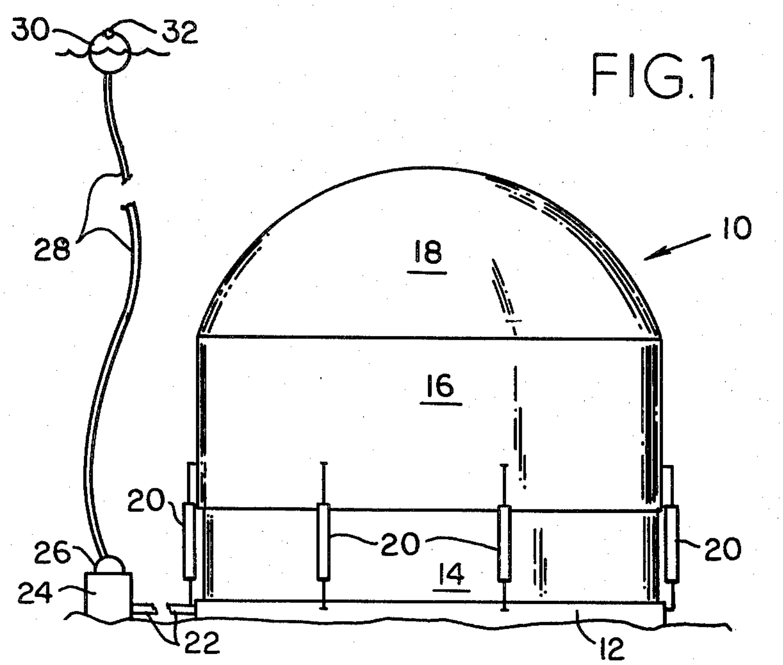
FIG. 1 is a view in side elevation of a seabed supported submarine pressure transfer storage facility for liquified gases in accordance with the present invention.
Figure 2:
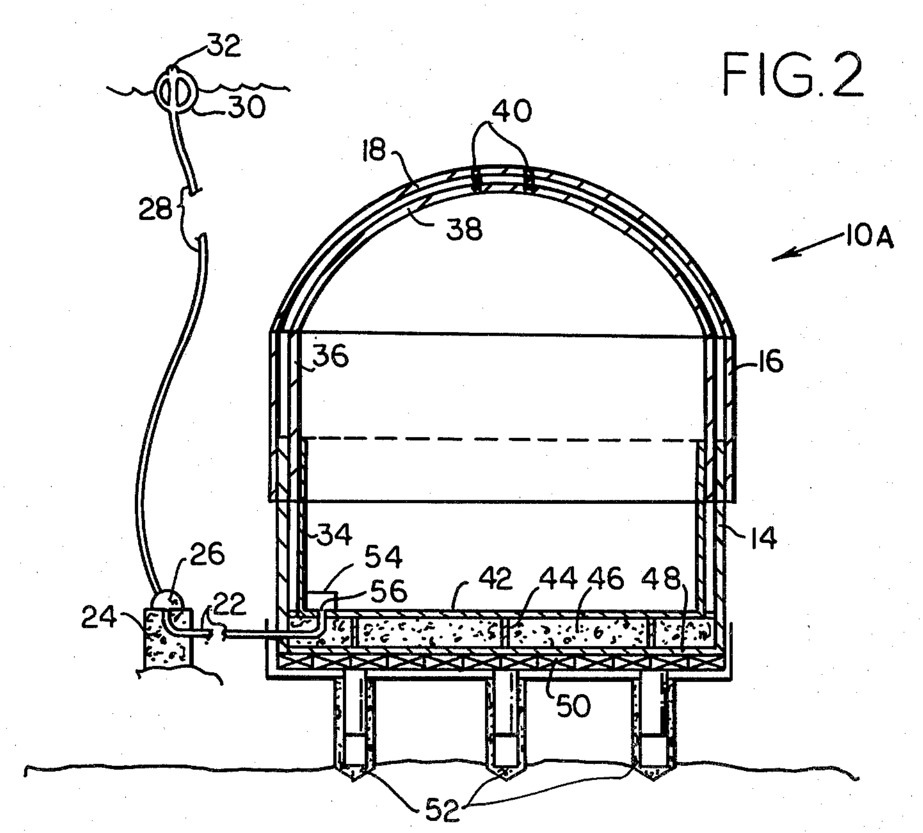
FIG. 2 is a view in side elevation and vertical diametrical section of a facility very similar to the one depicted in FIG. 1.

A seabed supported submarine pressure transfer storage facility 10 for cryogenically cooled and liquified energy gases ("LEG") and the like is depicted in overview in FIGS. 1 and 2. Therein the facility 10 includes a base 12 resting upon the seabed, a lower wall annular tank portion 14, an upper wall annular tank portion 16 which slides over the lower portion 14 in a sealing engagement therewith to produce a storage container characterized by piston-cylinder action. A dome shaped upper end portion 18 completes the outside structure of the facility 10.

Preferably, the facility 10 rests upon the seabed at a depth of about 200 meters where substantial pressures from ambient seawater are transferred by piston-cylinder action to the LEG contents stored inside the facility 10. In some operating conditions, more or less pressure may be applied to the liquified contents via the action of plural hydraulic rams 20 spaced about the periphery of the wall sections 14 and 16, secured from the base 12 to the upper wall 16, and drivingly connected in series to a source of controlled pressure hydraulic fluid. While hydraulic rams 20 are shown by way of example, other equivalent force-generating appliances and techniques may be applied to add to or subtract from the pressure of the ambient seawater.

In a co-pending patent application, Ser. No. 967,472, filed Dec. 7, 1978, now U.S. Pat. No. 4,232,983, I and my co-inventor Mark Stolowitz therein described a system which varies transferred pressure to stored LEG by depth selection of a submergible double piston tank. That same variable pressure transfer is achieved in my present invention through the additive or subtractive forces applied by the rams 20. If the facility 10 has to be located in shallow waters, the rams 20 may be used to supply additional pressure to the stored LEG. At advantageous great depths, the rams 20 may be utilized to work against the substantial ambient pressures, so that the facility 10 may be loaded with LEG without having to apply very substantial pressures to the LEG to drive it into the facility from the surface. In any event the rams 20 may be controlled remotely from a surface control point in accordance with sensed conditions within the facility and with external operations, such as loading and unloading. With the facility 10 at a substantial depth, a failure of the rams 20 applies maximum pressure to the stored contents, and this situation promotes the liquid state thereof. Consequently, in the deep sea environment, the ram system 20 fails safe, an important consideration in the handling of LEG.

For transferring LEG to and from the surface, the facility 10 further includes an external base conduit 22, a pylon 24, a swivel joint 26, a flexible seabed-to-surface conduit 28, and a floating LEG transfer buoy 30 from which a surface conduit 32 extends to a moored LEG transport vessel (not shown). The transfer buoy 30 may include the control and monitoring equipment for a facility, or it may include a telemetering station for sending condition signals and for receiving commands from a central monitoring and control location.

Referring to the FIG. 2 facility 10A (which is the same as the FIG. 1 facility 10 but without the pressure controlling rams 20), the outer walls 14, 16 and 18 have corresponding inner walls 34, 36, 38 which provide a thin-wall inner tank of suitable material for cryogenic tanks. Safety valves 40 facilitate removal of regassified gas at the top of the tank. An inner base plate 42, braces 44, perlite insulation 46 and an outer thickened base plate 48 complete the bottom of the tank structure 10A. A reinforced foundation plate 50 supports the tank within the foundation structure 12. A hydraulic levelling system 52 may be employed to level the facility 10A relative to the seabed. Other levelling techniques may also be utilized.

A vortex inhibiting fill and drain fitting 56 is placed inside the facility 10A and surrounds the interior termination 56 of the base conduit 22. This box shaped filling 56 is depicted in FIGS. 3-5, and it includes a series of openings 58 on the lower wall portions thereof. The flow of the LEG material into the interior of the tank 10 is illustrated by the arrows appearing in FIG. 4.

If shifting sea currents are present at the location of the facility 10, the rotating transfer coupling 26 is provided to accomodate movements of the conduit 28 which extends to the surface. As shown in FIG. 6 and 7 the coupling 26 includes a base section 60, and a swivel mounted upper section 62 which rotatably rides upon nylon or other suitable bearings 64. Seals 66 at a journal of the lower housing 60 and the upper housing 62 provide a barrier to the ambient sea water. An interior segment 68 of the seabed-to-surface conduit 22 includes a segment 70 which rotatably seats within an upper, vertically oriented segment of the base conduit 22. A flange 72 locks the upper section 62 to the bottom section 60. A strain relief seal 74 at the periphery of the upper section 62 where the conduit 28 exits provides strain relief and inhibits breaking or rupture of the conduit 28 at that point.

The floating LEG transfer buoy 30 can be any convenient flotation structure such as the sphere depicted in FIG. 8, or it may be a surface platform or other facility having reliquification equipment, control heads, crew accomodations, etc. Strain reliefs 76 and 78, useful to protect flexible conduit, and a flow control valve 80 may be included as a part of the buoy 30.

Maintenance of the facility 10 may be performed at the seabed with available submarine maintenance facilities and techniques. Alternatively, a flexible, inflatable floatation collar with ballast tanks may be attached to the facility 10, the tanks thereof inflated, and the buoyancy of the facility 10 made slightly positive in order to bring it to the surface for maintenance, inspection or relocation.

Figure 9:
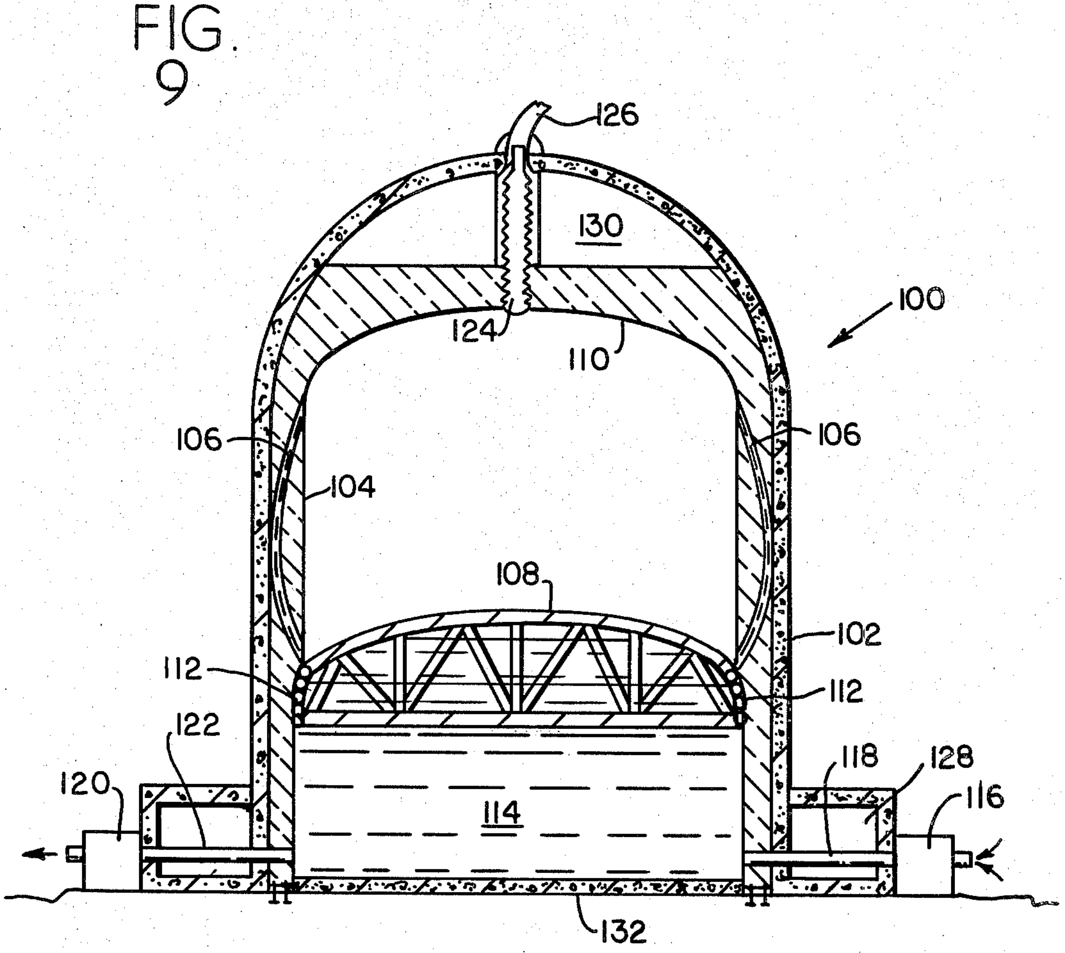
FIG. 9 is a view in side elevation and vertical diametrical section of an alternative embodiment of a seabed supported, ballasted submarine pressure transfer storage facility for liquified energy gases incorporating the principles of the present invention.
Figure 10:
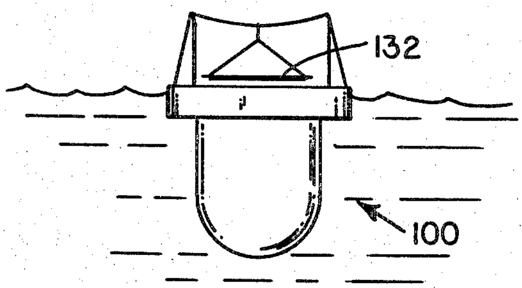
FIG. 10 is a diagrammatic view in side elevation of the facility depicted in FIG. 9 which has been ballasted and raised to the surface upside down for inspection and maintanance.

Another facility 100, incorporating the principles of the present invention, is depicted in FIGS. 9 and 10. Therein, the facility 100 is shown to include a unitary outer structure 102 formed of e.g. reinforced ferrocement as in ship hull construction. Coated steel alloy or reinforced fiberglass or carbon fiber structures might also be utilized. An inner thinwall cryogenic tank 104, made of any suitable material such as aluminum or steel alloys which function at cryogenic temperatures without failure, is held inside the structure 102 by prestressed side braces 106 which accomodate the substantial circumferential expansion and contraction of the inner tank 104 without failure. Suitable insulation is placed in the space between the outer structure 102 and the inner tank 104 to accomodate the severe thermal gradient presented when liquified material is stored in the tank 104.

A piston 108 is slidably disposed within the tank 104, and it has an upper surface preferably congruent with the upper contour of the tank 104 so that the piston may slide all the way up to the top 110 of the tank and thereby displace the entire volume thereof. The piston 108 is preferably made slightly frustoconical and is provided with an annular peripheral seal 112. The thermal gradient induced by the LEG causes the tank 104 to shrink, and the frustoconical contour of the piston 108 accomodates the distortion resulting from the extreme thermal gradient. This distortion is exaggerated in FIG. 9, and in practice will be much smaller than depicted therein.

The piston 108 is driven up and down within the tank 104 by pressure from seawater contained in a lower chamber 114. The seawater passes from ambient surroundings at the seabed into the chamber via a pressure regulated inlet valve 116 and its connecting conduit 118. Seawater may be removed from the chamber 114 by a high pressure underwater outflow pump 120 via its conduit 122. The pump 120 may be provided with electrical energy from the surface, or it may be entirely self contained within the facility 100. At a desired operating depth of 200 meters, more than ample pressure is available from ambient seawater to drive the piston 108, and the amount of pressure actually applied to the LEG is determined by the cooperative action of the valve 116 and the pump 120. In the event of a failure of either or both valve 116 and pump 120, the system 100 fails "safe", that is with maximum pressure being applied to the LEG. A flexible coupling 124, and a flexible conduit 126 including a safety cutoff valve (not shown) enable LEG to be transferred from the surface to the tank 104. The pressure applied by the piston 108 may be adjusted in order to accomodate loading and unloading of LEG.

One inherent feature of the facility 100, not included as an integral part of the facility 10 already described, is a capability for surfacing. Ballast tanks 128 and 130 are provided for seawater which may be expelled in order to create a slight positive buoyancy. In this condition, the facility 100 slowly ascends to the surface. The ballast tanks 128 and 130 may be provided with baffling to minimize swash in accordance with well known marine engineering principles.

As shown in FIG. 10, the storage facility 100 may be brought to the surface upside down by controlled ballasting of tanks 128 and 130. In this position, a removable bottom hatch 132 may be removed by a crane assembly temporarily rigged to the facility 100. Then, a maintenance crew may gain access to and remove the piston 108 and then reach the interior of the tank 104. The valve 116 and pump 120 are also easily serviced by this inverted surface access.

As can be seen in FIG. 9, the facility 100 merely rests upon the seabed and is held there by ballasting. In this fashion, the facility 100 is readily relocatible as gas fields are developed and consumed. The facility 100 also provides a ready method to disperse energy resources during wartime and periods of emergency.

As has been illustrated, both storage facilities 10 and 100 advantageously utilize transfer of pressure derived from ambient seabed depth seawater in order to maintain and promote liquid state of the liquified gases stored therein. In each example the transferred pressure may be varied to accomodate actual operating conditions, should that feature of the present invention be desired or required. In the facility 10 mechanical means are utilized to regulate pressure transfer. In the facility 100, hydraulic means are the disclosed regulatory mechanism. Any satisfactory means for pressure regulation may be employed in practicing this invention, and the examples given are for purposes of illustration only.

Having thus described two embodiments of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosures and the description herein are purely illustrative and are not intended to be in any sense limiting.

I claim:

1. A seabed supported submarine storage facility for cryogenically cooled and liquified gases, said facility operating entirely submerged at a fixed substantial depth offshore, said facility comprising:

a two-part sealed, slidably telescoping pressure transfer tank adapted for transferring pressure derived from ambient water at said depth to said liquified gases stored in said tank to promote and maintain the liquid state of said gases, conduit means extending between said tank and the surface to facilitate loading and unloading of said tank, pressure control means comprising a plurality of hydraulic rams commonly operative between said two parts of said tank for controlling the amount of actual pressure applied to said stored gases.

2. The facility set forth in claim 1 further comprising leveling means attached to said tank for the levelling thereof relative to the contour of said seabed.

3. The facility set forth in claim 1 wherein said conduit means includes vortex prevention means at a discharge location within said tank for preventing formation of vortexes in said liquified gases during loading and unloading thereof at said tank.

4. The facility set forth in claim 1 wherein said conduit means includes a swivel joint at said tank for enabling said conduit means to swivel arcuately and freely relative to said tank.

5. The facility set forth in claim 1 further comprising surface buoy means for supporting the surface end of said conduit means and for marking the location of said facility in the ocean.

6. A seabed supported submarine storage facility for cryogenically cooled and liquified gases, said facility operating entirely submerged at a fixed substantial depth offshore, said facility comprising:

a single insulated pressure vessel for receiving and holding said liquified gases and including pressure transfer means comprising an insulated piston disposed within said vessel in sealed sliding engagement having one major surface forming an interior wall of said vessel and having the other surface forming a wall in a sealed seawater-containing compartment in said vessel, conduit means extending between said container means and the surface of the sea for conducting said gases between said pressure vessel and the surface to facilitate loading and unloading of said pressure vessel, pressure control means operatively connected to said pressure vessel and comprising controlled pressure regulator means for admitting and expelling ambient water to and from said compartment in order to control the actual pressure applied by said piston to said stored gases.

7. The facility set forth in claim 6 wherein said controlled pressure regulator means comprises valve and pump means for admitting and expelling said ambient water.

* * * * *